(12) United States Patent
Cox et al.

(10) Patent No.: US 7,658,157 B2
(45) Date of Patent: Feb. 9, 2010

(54) BOXED TREE TRANSPORTER

(75) Inventors: Thomas Cox, Tomball, TX (US); Mark A. Merit, Tomball, TX (US)

(73) Assignee: Environmental Tree & Design, Inc., Tomball, TX (US)

( * ) Notice: Subject to any disclaimer, the term of this patent is extended or adjusted under 35 U.S.C. 154(b) by 107 days.

(21) Appl. No.: 11/810,548

(22) Filed: Jun. 6, 2007

(65) Prior Publication Data

US 2008/0302284 A1 Dec. 11, 2008

(51) Int. Cl.
*A01C 11/00* (2006.01)
*A01G 23/02* (2006.01)

(52) U.S. Cl. ........................ 111/101; 111/200; 111/900; 111/919

(58) Field of Classification Search ......... 111/100–107, 111/114, 200, 900, 919
See application file for complete search history.

(56) References Cited

U.S. PATENT DOCUMENTS

| | | |
|---|---|---|
| 3,134,196 A | 5/1964 | Hansen |
| 3,979,856 A | 9/1976 | Belcher |
| 4,062,148 A | 12/1977 | Edmonds, Jr. et al. |
| 4,250,664 A | 2/1981 | Remke |
| 4,403,447 A | 9/1983 | Braun |
| 4,417,416 A | 11/1983 | Johnson |
| 4,478,260 A | 10/1984 | Eichler |
| 4,604,825 A | 8/1986 | Mainprice |
| 4,658,518 A | 4/1987 | Korenek |
| 4,756,259 A | 7/1988 | Korenek |
| 5,090,157 A | 2/1992 | Sipala |
| 5,158,418 A | 10/1992 | Korenek |
| 5,265,375 A | 11/1993 | Korenek |
| 5,311,700 A | 5/1994 | Thomas |
| 5,918,556 A | 7/1999 | Williams |
| 6,253,690 B1 | 7/2001 | Cox |
| 6,530,333 B1 | 3/2003 | Cox |
| 6,561,108 B2 | 5/2003 | Fisher |

*Primary Examiner*—Christopher J. Novosad
(74) *Attorney, Agent, or Firm*—Browning Bushman P.C.

(57) ABSTRACT

A transporter 16 is provided for moving a live tree which has a root ball B which is boxed or otherwise contained. A powered slide mechanism 22 is movable from an inclined position to engage the boxed tree to a horizontal transport position on the trailer or truck bed. A powered loading mechanism 26 attached to the slide mechanism engages the boxed tree to move up the inclined slide mechanism. A powered tilting mechanism 40 tilts the boxed tree to an inclined transport position.

20 Claims, 4 Drawing Sheets

BOXED TREE TRANSPORTER

FIELD OF THE INVENTION

The present invention relates to equipment and techniques for transporting live trees with substantial root balls. More particularly, the present invention relates to a transporter for a boxed tree which lifts the boxed tree from an initial hole in the ground and positions the boxed tree in an inclined position on a trailer for transport.

BACKGROUND OF THE INVENTION

Various types of equipment have been devised for transporting large trees. One common technique utilizes ground piercing blades which, when fully positioned, effectively capture the root ball of the tree, then lift the root ball and tree out of the ground. Depending on the distance between the initial tree position and the desired tree position, a tractor with such a blade mechanism may transport the tree with the same equipment. Blade-type tree moving devices are disclosed, for example, in U.S. Pat. Nos. 4,417,416, 4,658,518, and 6,561,008. More recent tree planting equipment with ground engaging blades is disclosed in U.S. Pat. Nos. 6,253,690 and 6,530,333.

A substantially dissimilar technique for moving large trees involves forming a box around and under the root ball of the tree. There are several advantages to a boxed tree for shipment, since numerous trees can be shipped on a highway by a flat bed trailer without transporting the ground engaging blades. Also, the boxed tree may be treated for a substantial period of time, e.g., six to 12 months, subsequent to being removed from the ground and prior to transplanting, with these treatments substantially contributing to the health and vitality of the tree, and increasing the likelihood that the transplanted tree will be successful. Various techniques for forming a box around a tree root ball are disclosed in U.S. Pat. Nos. 4,756,259, 5,265,375, and 5,311,700. A transport intended to lift a root ball from the ground and position the tree on a trailer is disclosed in U.S. Pat. No. 5,158,418. The complexity of various equipment used to lift the root ball from the ground and then position the root ball at a desired inclination on the bed of the trailer practicality limit systems of the type disclosed in the '418 Patent.

Boxed trees may include wooden sides to hold the root ball together, and a bottom may be formed by planks, sheets, or pipe. In other embodiments, a boxed tree is "boxed" or contained by other types of containers, such as slats, wire mesh, wire sheets, burlap, or boards, as disclosed in U.S. Pat. Nos. 3,134,196, 3,979,856, 4,062,148, 4,250,664, 4,403,447, 4,478,260, 4,604,825, and 5,090,157. Contained root balls wherein the container is not part of the ground piercing blades are considered boxed trees, regardless of the material used to contain the root ball.

U.S. Pat. No. 4,478,260 discloses one technique for lifting a root ball from the ground. Another technique presumably designed for transporting larger trees is disclosed in U.S. Pat. No. 5,918,556, wherein a lifting mechanism raises the root ball, then a flat bed trailer is positioned under the raised root ball and transported to the desired site. The lifting mechanism obviously has to be present at the initial or former site and at the new transplanted site for the tree, and represents a substantial cost for the technique disclosed in the '556 Patent. Moreover, the '556 Patent does not disclose a mechanism for tilting the root ball so that the trunk of the tree is inclined rather than vertical. Most large trees cannot be moved along the highway system if the trees were vertical, and even if such movement is possible, a raised tree could be easily damaged during transport by the wind and by branch interfering objects.

The disadvantages of the prior art are overcome by the present invention and an improved boxed tree transporter and method are hereinafter disclosed.

SUMMARY OF THE INVENTION

In one embodiment, a boxed tree transporter includes a trailer or truck bed having a bed support surface raised from the ground level, and a powered slide mechanism movable from a lower boxed tree engaging position to an upper transport position. A powered loading mechanism engages the boxed tree to move the tree up the lowered slide mechanism. A powered cradle pivotally attached to the trailer or truck bed tilts the boxed tree while on the trailer or truck bed from a substantially upright position to an inclined transport position.

These and further features and advantages of the present invention will become apparent from the following detailed description, wherein reference is made to the figures in the accompanying drawings.

DETAILED DESCRIPTION OF PREFERRED EMBODIMENTS

Figure 1:
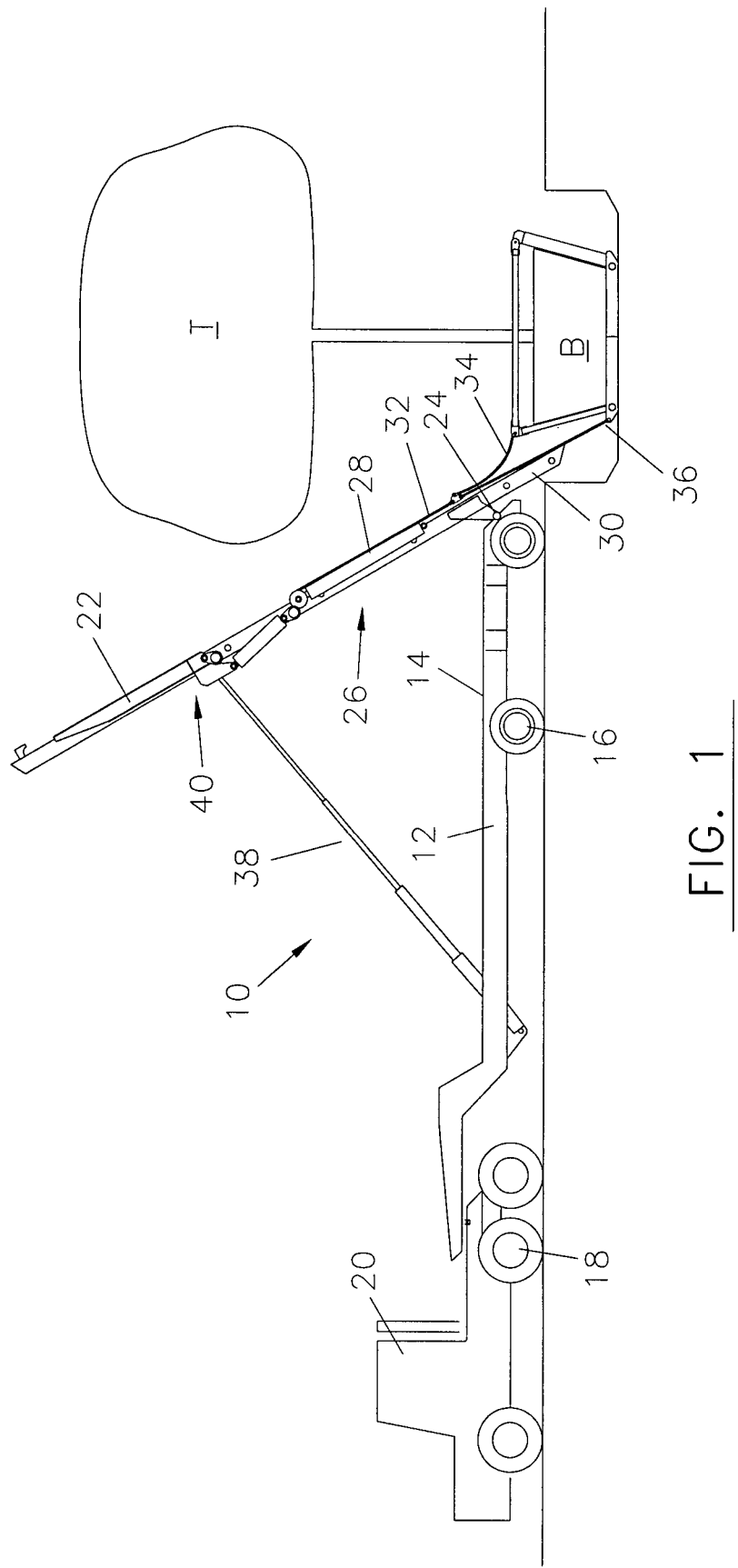
FIG. 1 is a side view of a boxed tree and an inclined slide mechanism.
Figure 3:
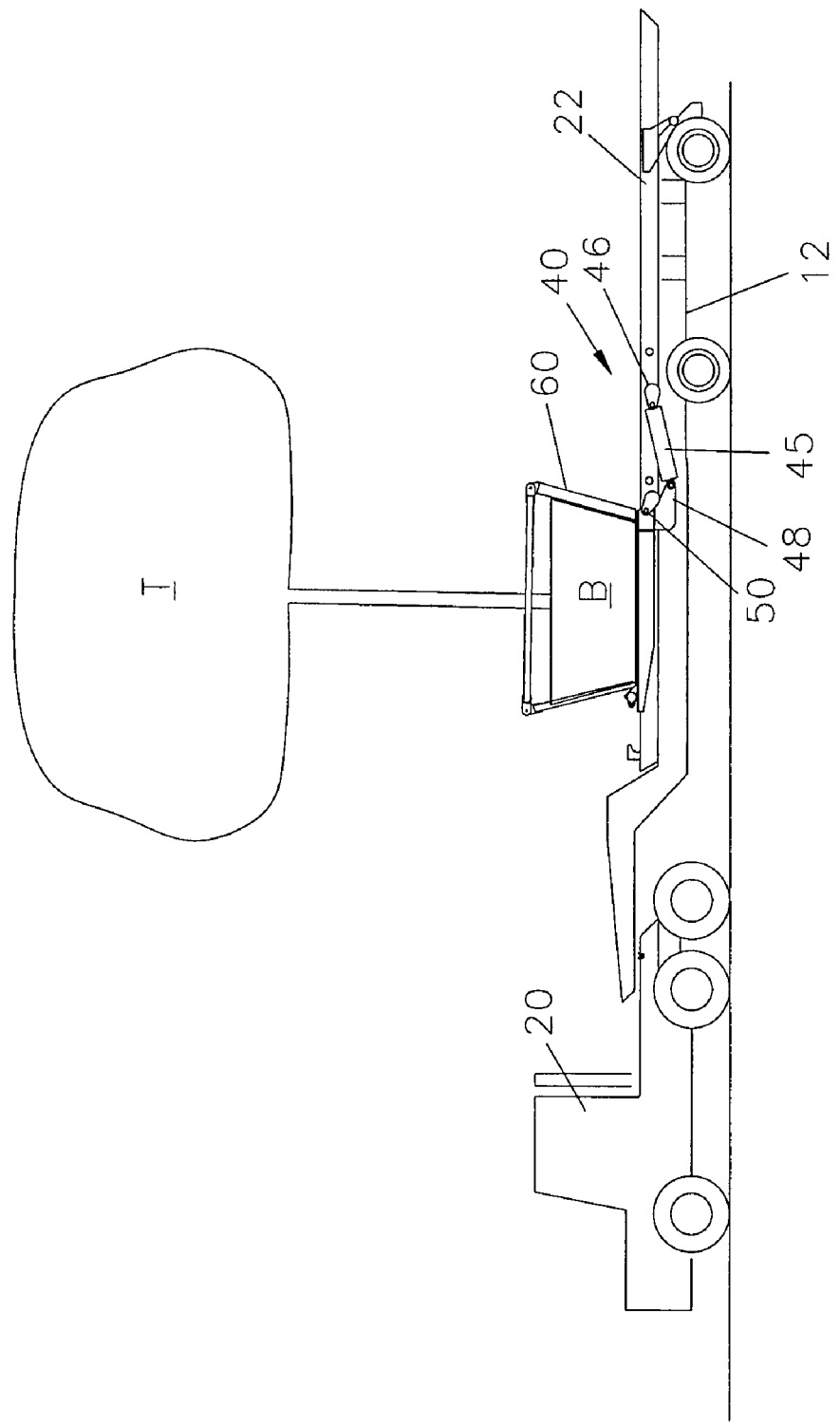
FIG. 3 shows the boxed tree in an upright position on the trailer or truck bed.

FIG. 1 depicts one embodiment of a transporter 10 according to the present invention for transporting a live boxed tree T having a root ball B. The transporter includes a trailer or truck bed 12 having a bed support surface 14 raised from the ground level in a conventional manner. The trailer also includes a powered drive mechanism, which may be a tractor 20 removably attached to the trailer or truck bed, or a transporter cab with a fixed bed assembly. The bed is supported on a plurality of axles 16, and the tractor or cab 20 includes a similar plurality of axles 18. A powered slide mechanism 22, which preferably includes a hydraulic cylinder 38, is pivotally attached at 24 to the rearward portion of the trailer or truck bed, such that the slide mechanism 22 is movable from an inclined boxed tree engaging position as shown in FIG. 1 to a relatively horizontal transport position as shown in FIG. 3. The slide mechanism 22 is thus pivotally supported on the trailer frame or bed, and the cylinder 38 acts between the frame and the slide mechanism to raise or lower the slide.

Figure 2:
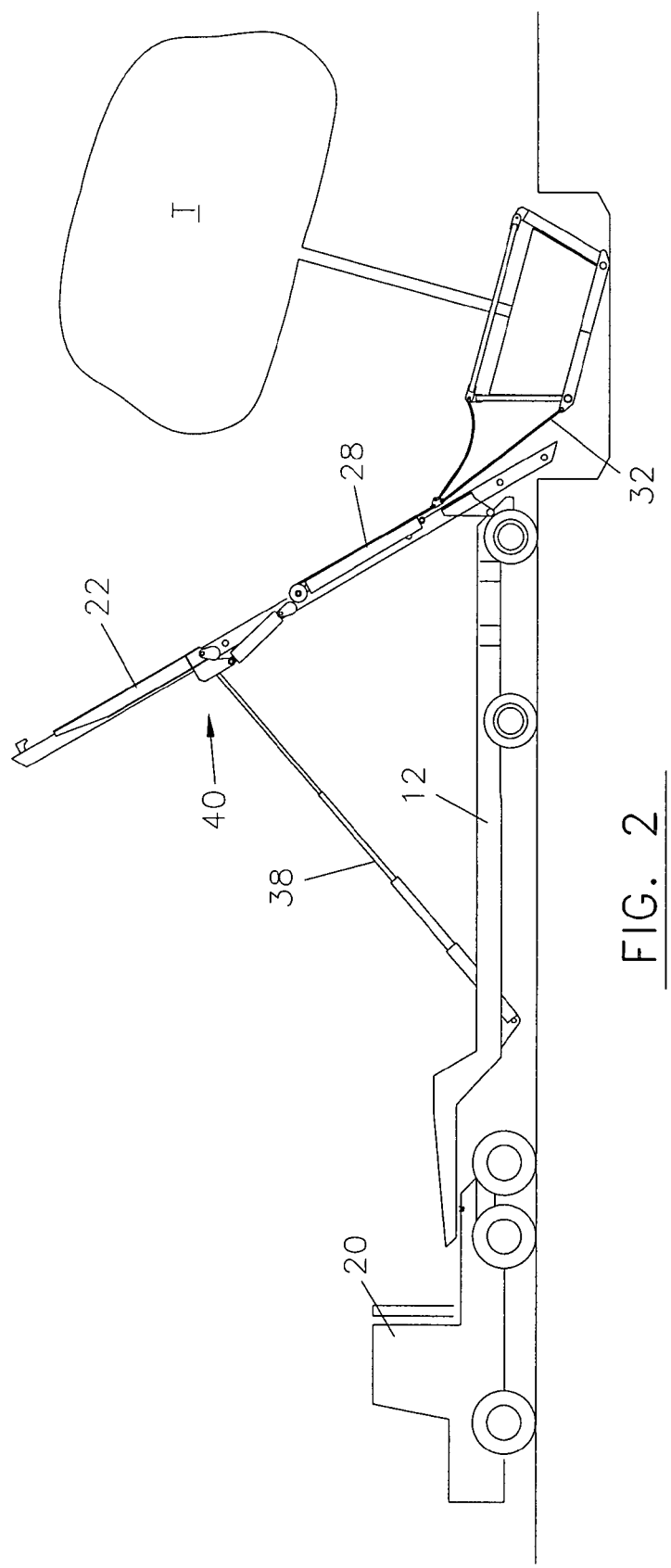
FIG. 2 illustrates the boxed tree initially raised on the slide mechanism by the powered loading mechanism.

The powered loading mechanism 26, which in a suitable embodiment includes a hydraulic cylinder 28, may be used for engaging the boxed tree and moving the boxed tree up the inclined slide mechanism 22. More particularly, FIG. 1 illustrates one end of a cable 32 attached to the box at connector 36 for lifting the root ball of the tree, while another cable also attached to and powered by the cylinder 28 is connected to an upper portion of the box at connector 34. The components are positioned such that when the rearward end of the slide mechanism 22 is below the ground level, as shown in FIG. 1, the powered loading mechanism 30 may be activated so that the cables 32 effectively tilt the box, as shown in FIG. 2, and begin to pull the box up the slide mechanism. Those skilled in the art may appreciate that the powered cylinder 28 may be operated in conjunction with hydraulic cylinders 38, which raise and lower the slide mechanism, so that the box moves up the slide mechanism while the slide mechanism is slowly lowered back toward a horizontal transport position, thereby reducing the tension on the cables 32 required to pull the box up the incline. Once the center of gravity of the box and thus the root ball is substantially adjacent the pivot point 24, the cylinder 38 may be activated to slowly lower the boxed tree, while the loading mechanism 26 securely pulls the boxed tree forward on the powered slide mechanism, until positioned substantially as shown in FIG. 3. The cables 32 may be shortened to pull the tree forward toward the tilting mechanism, and/or cables may be re-attached lo a rearward portion of the box to pull the box forward on the horizontal slide mechanism. FIGS. 1 and 2 illustrate a taut cable attached to lower box connector 36, and a slack cable attached to upper box connector 34. For many applications, the slack cable is unnecessary and may be eliminated.

In another embodiment, the powered loading mechanism 26 may comprise a powered winch for rotating a drum on which a cable is wound, such that activation of the winch raises and lowers the box along the slide mechanism 22, with the box attached between the winch and the cable. In either case, the powered loading mechanism asserts a pulling force on the boxed tree in a direction substantially parallel to the slide mechanism, and for many applications the powered loading mechanism will be structurally supported on the slide mechanism.

Figure 4:
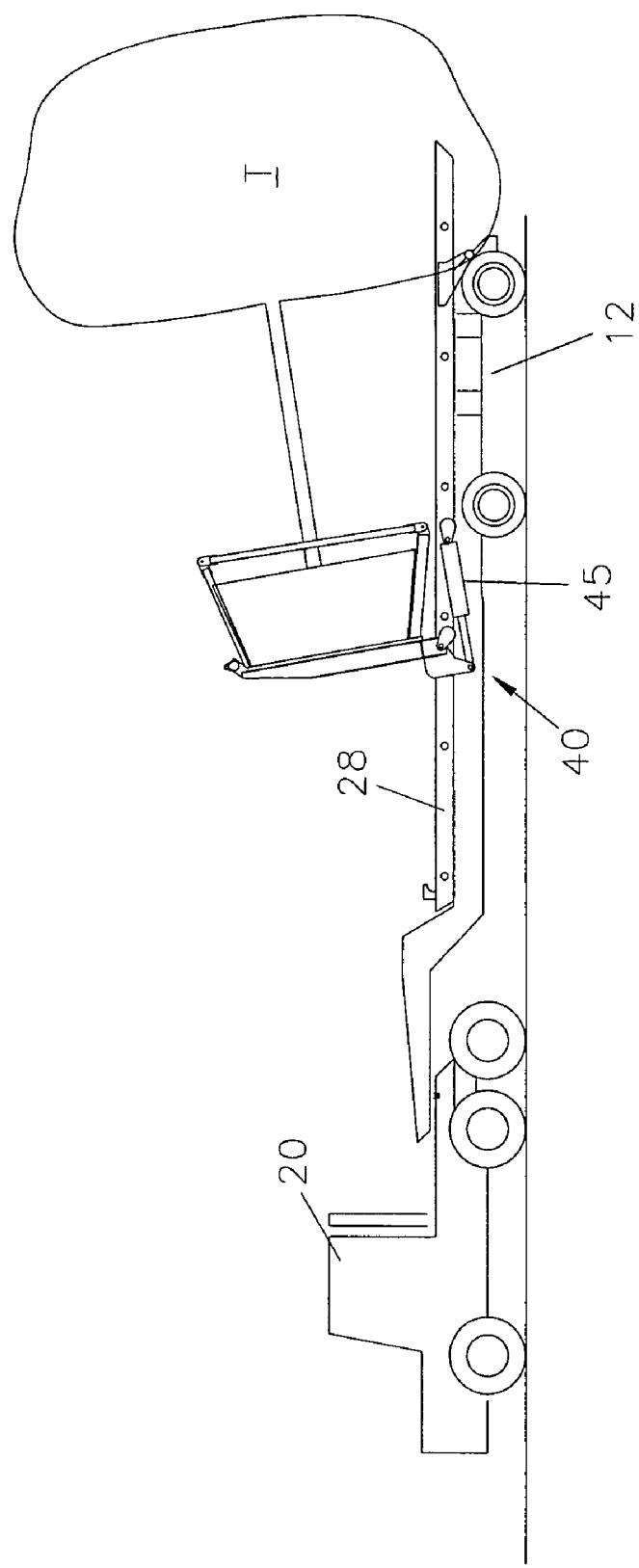
FIG. 4 illustrates the powered cradle mechanism tilting the tree to an inclined position.

With the tree supported on the bed of the transporter, a powered tilting mechanism 40 may bemused for tilting the box tree from a substantially upright position as shown in FIG. 3 to a transport position as shown in FIG. 4. This tilting of the box tree desirably occurs while the powered slide mechanism is in its substantially horizontal transport position. More particularly, the powered tilting mechanism 40 includes a cylinder 45 pivotally attached to the slide mechanism 22 at connection 46, with the opposite end of cylinder 45 attached to pivot arm 48 which rotates about pivot axis 50, which has its axis preferably stationary with respect to the slide mechanism. Cylinder 45 acts between the slide mechanism 28 and the arm 48, and the cantilevered end of the arm 48 is pivotally attached to the boxed tree at connection 50. When the cylinder 45 is extended, as shown in FIG. 4, the front side of the box is tipped downward, thereby beginning to incline the boxed tree. Cylinder extension is continued, as shown in FIG. 4, until the arm 48 brings a side of the box in substantially planar engagement with the trailer or truck bed. The powered tilting mechanism 40 may thus be supported on the slide mechanism 22 in a position between the root ball and a rearward end of the slide mechanism. In an alternative embodiment, the powered tilting mechanism could be provided between the root ball and a forward end of the trailer. In yet another embodiment, the powered tilting mechanism could be pivotally connected to the frame or trailer or truck bed. The tree is substantially inclined as shown in FIG. 4 and may be reliably moved down a road. Those skilled in the art will appreciate that the particular angle of the tree desired for moving may be adjusted by putting blocks or other types of spacers under the boxed tree, so that the tree box rests on these spacers and is at a desired angle.

In a preferred application, guide mechanism 22 when in the transport position is substantially at the level of the support surface for the trailer or truck bed. The slide mechanism may thus support a portion of the weight of the root ball when in the transport position, and the trailer or truck bed may separately support another portion of the root ball.

Various types of frames 60 may be provided for supporting the box tree and for attachment to the cables or other powered loading mechanism. A suitable frame may be made from various metal materials, with a wooden box within the frame. In other applications, various types of containers may be used for holding the boxed tree, and in some applications the cables or other powered loading mechanism may attach directly to the material which contains the root ball of the tree.

To unload the tree, a powered tilting mechanism may first be activated to return the tree to the substantially upright position. The powered slide mechanism may then be tilted so that the tree begins to slide down the slide mechanism due to the effect of gravity. The cable 32 may be attached to the boxed tree to ensure that travel of the boxed tree proceeds at a controlled rate. The boxed tree may be lowered directly into a hole dug of a size sufficient to receive the boxed tree. Once the tree is in the hole, the cable may be detached and the transporter moved slowly away as the powered slide mechanism is lowered.

Depending on the size of the transporter, either pneumatic or hydraulic cylinders may be used, and the term "hydraulic cylinder" as used herein is intended to include any type of fluid cylinder. Each of the hydraulic cylinders disclosed herein may be powered from a hydraulic source carried on the tractor, and connected to each cylinder with respective hydraulic hoses. A pneumatic cylinder may thus be used for some applications, depending on the available options in the tractor.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A transporter for transporting a live boxed tree having a root ball, comprising:

a bed having a bed support surface raised from the ground level;

a powered slide mechanism pivotally attached to the bed and movable from an inclined boxed tree engaging position wherein a lower end of the powered slide mechanism is below the bed support surface to engage the boxed tree to a substantially horizontal transport position wherein the powered slide mechanism is substantially parallel to the bed support surface, the powered slide mechanism including a substantially planar surface for supporting the boxed tree as it slides along the substantially planar surface when in the inclined boxed tree engaging position;

a powered loading mechanism for engaging the boxed tree and moving the boxed tree along the substantially planar surface of the powered slide mechanism; and a powered tilting mechanism attached to the bed for tilting the boxed tree while the powered slide mechanism is in the relatively horizontal transport position from a substantially upright position to an inclined transport position.

2. A transporter as defined in claim 1, wherein the powered loading mechanism comprises a hydraulic loading cylinder and a cable for engaging the boxed tree.

3. A transporter as defined in claim 2, further comprising:
a frame for supporting the boxed tree and for attachment to the cable.

4. A transporter as defined in claim 1, wherein the powered loading mechanism is supported on the powered slide mechanism.

5. A transporter as defined in claim 1, wherein the powered loading mechanism moves the boxed tree at least partially up the powered slide mechanism while the boxed tree is positioned within a hole below ground level.

6. A transporter as defined in claim 1, wherein the powered slide mechanism is moved toward the inclined position to slide the boxed tree down the slide mechanism.

7. A transporter as defined in claim 1, wherein the slide mechanism, when in the transport position, is substantially at the level of the bed support surface, such that the bed supports at least a portion of the weight of the root ball when the slide mechanism is in the transport position.

8. A transporter as defined in claim 1, wherein each of the powered slide mechanism and the powered tilting mechanism are powered by one or more hydraulic cylinders.

9. A transporter as defined in claim 1, wherein the powered tilting mechanism is pivotally connected to the slide mechanism at a position between the root ball and a rearward end of the slide mechanism.

10. A transporter for transporting a live boxed tree having a root ball, comprising:
a bed having a bed support surface raised from the ground level;
a powered slide mechanism pivotally attached to the bed and movable from an inclined boxed tree engaging position wherein a lower end of the powered slide mechanism is below the bed support surface to engage the boxed tree to a substantially horizontal transport position wherein the powered slide mechanism is substantially parallel to the bed support surface, the slide mechanism powered by a hydraulic cylinder acting between the bed and the slide mechanism, the powered slide mechanism including a substantially planar surface for supporting the boxed tree as it slides along the substantially planar surface;
a powered loading mechanism for engaging the boxed tree and moving the boxed tree along the substantially planar surface of the powered slide mechanism; and
a powered tilting mechanism attached to the bed for tilting the boxed tree while the powered slide mechanism is in the relatively horizontal transport position from a substantially upright position to an inclined transport position, the tilting mechanism powered by another hydraulic cylinder acting between the bed and the slide mechanism.

11. A transporter as defined in claim 10, further comprising:
a root ball frame for supporting the root ball of the boxed tree and for attachment to a cable connecting the loading mechanism to the root ball frame.

12. A transporter as defined in claim 10, wherein the powered loading mechanism is supported on the powered slide mechanism.

13. A transporter as defined in claim 10, wherein the powered slide mechanism is moved toward the inclined position to slide the boxed tree down the slide mechanism.

14. A transporter as defined in claim 10, wherein the slide mechanism, when in the transport position, is substantially at the level of the bed support surface, such that the bed supports at least a portion of the weight of the root ball when the slide mechanism is in the transport position.

15. A transporter as defined in claim 10, wherein the powered tilting mechanism is pivotally connected to the slide mechanism.

16. A method of transporting a live boxed tree having a root ball, comprising:
providing a bed having a bed support surface raised from the ground level;
pivotally attaching a powered slide mechanism pivotally attached to the bed and movable from an inclined boxed tree engaging position wherein a lower end of the powered slide mechanism is below the bed support surface to engage the boxed tree to a substantially horizontal transport position wherein the powered slide mechanism is substantially parallel to the bed support surface, the powered slide mechanism including a substantially planar surface for supporting the boxed tree as it slides along the substantially planar surface;
engaging the boxed tree with a powered loading mechanism and moving the boxed tree along the substantially planar surface of the powered slide mechanism; and
pivotally attaching a powered tilting mechanism to the bed for tilting the boxed tree while the powered slide mechanism is in the relatively horizontal transport position from a substantially upright position to an inclined transport position.

17. A method as defined in claim 16, further comprising:
supporting the powered loading mechanism on the powered slide mechanism.

18. A method as defined in claim 16, wherein the powered loading mechanism moves the boxed tree at least partially up the powered slide mechanism while the boxed tree is positioned within a hole below ground level.

19. A method as defined in claim 16, wherein the powered slide mechanism is moved toward the inclined position to slide the boxed tree down the slide mechanism.

20. A method as defined in claim 16, wherein the slide mechanism, when in the transport position, is substantially at the level of the bed support surface, such that the bed supports at least a portion of the weight of the root ball when the slide mechanism is in the transport position.

* * * * *